US011300126B2

(12) United States Patent
Yang

(10) Patent No.: US 11,300,126 B2
(45) Date of Patent: Apr. 12, 2022

(54) COMPRESSOR HAVING CONTROLLABLE OIL SUPPLY AND VEHICLE

(71) Applicant: GUANGDONG MEIZHI COMPRESSOR CO., LTD., Guangdong (CN)

(72) Inventor: Kaicheng Yang, Guangdong (CN)

(73) Assignee: GUANGDONG MEIZHI COMPRESSOR CO., LTD., Guangdon (JP)

( * ) Notice: Subject to any disclaimer, the term of this patent is extended or adjusted under 35 U.S.C. 154(b) by 411 days.

(21) Appl. No.: 16/479,312

(22) PCT Filed: Jan. 24, 2017

(86) PCT No.: PCT/CN2017/072520
§ 371 (c)(1),
(2) Date: Jul. 19, 2019

(87) PCT Pub. No.: WO2018/137160
PCT Pub. Date: Aug. 2, 2018

(65) Prior Publication Data
US 2019/0376519 A1 Dec. 12, 2019

(51) Int. Cl.
*F01C 21/04* (2006.01)
*F04C 29/02* (2006.01)
(Continued)

(52) U.S. Cl.
CPC .......... *F04C 29/021* (2013.01); *F04B 1/2064* (2013.01); *F04B 39/0284* (2013.01); *B60H 1/3214* (2013.01); *F04C 2210/206* (2013.01)

(58) Field of Classification Search
CPC ...... F04C 29/021; F04C 29/028; F04C 29/02; F04B 1/2064; F04B 39/0284
See application file for complete search history.

(56) References Cited

U.S. PATENT DOCUMENTS 4,624,630 A * 11/1986 Hirahara ............... F04C 29/028
418/63
4,828,466 A * 5/1989 Kim ...................... F04C 29/028
184/6.16

(Continued)

OTHER PUBLICATIONS

International Search Report dated Oct. 25, 2017 issued in PCT/CN2017/072520.

*Primary Examiner* — Deming Wan
(74) *Attorney, Agent, or Firm* — Scully Scott Murphy & Presser

(57) ABSTRACT

A compressor (100) and a vehicle are disclosed. The compressor (100) includes: a housing (1); a separating component (2) dividing an interior of the housing (1) into a low-pressure chamber (13) and a high-pressure chamber (14); a cylinder component (3); a crankshaft (4); a plurality of oil transmission grooves (5); and at least one oil transition groove (6). During the rotation of the crankshaft (4), each oil transition groove (6) is intermittently in communication with oil transmission grooves (5) adjacent thereto. The oil transition groove (6) is alternately in communication with two oil transmission grooves (5) located at two circumferential sides of the oil transition groove (6). An oil-way passage (31) of the cylinder component (3) is in communication with one of oil transmission grooves (5), and another one of oil transmission grooves (5) or the oil transition groove (6) is in communication with the low-pressure chamber (13).

13 Claims, 7 Drawing Sheets

(51) Int. Cl.
    *F04B 39/02*     (2006.01)
    *F04B 1/2064*     (2020.01)
    *B60H 1/32*     (2006.01)

(56) References Cited

U.S. PATENT DOCUMENTS

| | | | | |
|---|---|---|---|---|
| 5,226,797 A | * | 7/1993 | Da Costa | F04C 29/028 418/150 |
| 9,447,786 B2 | * | 9/2016 | Tanaka | F01C 1/0215 |

* cited by examiner

CRANKSHAFT ROTATION DIRECTION

COMPRESSOR HAVING CONTROLLABLE OIL SUPPLY AND VEHICLE

CROSS-REFERENCE TO RELATED APPLICATIONS

This is a national stage of International Application No. PCT/CN2017/072520, filed Jan. 24, 2017, the entire contents of which is incorporated herein by reference. No new matter is added.

FIELD

The present disclosure relates to a field of mechanical manufacturing, and more particularly relates to a compressor and a vehicle.

BACKGROUND

Generally, an oil pumping mode of a compressor can meet use requirements of air conditioners. However, for an air conditioner on mobile equipment such as an automobile or an airplane, it is difficult for the oil pumping mode of the existing compressor to meet the use requirements, since a working state of the mobile equipment is non-stationary and there will be bumps or vibrations more or less. In the related art, with arrangement of a high-pressure chamber and a low-pressure chamber in a housing of the compressor, oil for lubrication is supplied from a high pressure side bearing to a low pressure side bearing under the pressure difference between the high-pressure chamber and the low-pressure chamber. Although such an oil pumping method can adapt to road conditions which the mobile transportation equipment faces, the oil supply amount varies significantly and uncontrollably with working conditions, resulting in low efficiency of the compressor.

SUMMARY

The present disclosure aims to solve at least one of the problems existing in the related art to some extent. For this purpose, the present disclosure provides a compressor that can achieve quantitative oil supply, thereby improving efficiency of the compressor.

The present disclosure further provides a vehicle including the above compressor.

According to embodiments of the present disclosure, a compressor includes: a housing provided with an air suction port and an air exhaust port; a separating component provided to the housing to divide an interior of the housing into a low-pressure chamber and a high-pressure chamber, the air suction port being in communication with the low-pressure chamber while the air exhaust port being in communication with the high-pressure chamber, the separating component including a main bearing having a first end surface located in the low-pressure chamber, and the high-pressure chamber being provided with an oil sump therein; a cylinder component provided in the high-pressure chamber, the main bearing having a second end surface provided to the cylinder component, and the cylinder component being provided with an oil-way passage in communication with the oil sump; a crankshaft fitted with a piston in the cylinder component, the main bearing being fitted over the crankshaft, and the crankshaft having an end extending into the lower pressure chamber; and a plurality of oil transmission grooves and at least one oil transition groove, each oil transmission groove and each oil transition groove extending along an axial direction of the crankshaft, and the plurality of oil transmission grooves and the at least one oil transition groove being staggered in the axial direction of the crankshaft, wherein during rotation of the crankshaft, each oil transition groove is intermittently in communication with oil transmission grooves adjacent thereto, and the oil transition groove is alternately in communication with two oil transmission grooves at two circumferential sides of the oil transition groove; the oil transmission grooves are provided in one of the main bearing and the crankshaft, and the oil transition groove is provided in the other one of the main bearing and the crankshaft; the oil-way passage is in communication with one of the oil transmission grooves, and another one of the oil transmission grooves or the oil transition groove is in communication with the low-pressure chamber.

In the compressor according to embodiments of the present disclosure, the plurality of oil transmission grooves and at least one oil transition groove are provided and staggered in the axial direction of the crankshaft, and during the rotation of the crankshaft, each oil transition groove is intermittently in communication with oil transmission grooves adjacent thereto, and the oil transition groove is alternately in communication with two oil transmission grooves at two circumferential sides of the oil transition groove, such that it is advantageous to realizing the on-demand oil pumping of the compressor, so as to achieve the maximum utilization of the lubricating oil in the compressor, thereby improving the efficiency of the compressor.

According to some embodiments of the present disclosure, the compressor has a displacement represented by A, and the oil transition groove has a capacity ranging from 5 A/1000 to 30 A/1000.

According to some embodiments of the present disclosure, the oil transition groove has a cross section with a maximum width represented by K, and the oil transition groove has a depth represented by H, in which H<0.8K.

According to some embodiments of the present disclosure, the oil transition groove is defined in an outer peripheral wall of the crankshaft.

Specifically, the crankshaft has an outer diameter represented by J, and the oil transition groove has a cross section with a maximum width represented by K, in which K ranges from 0.1 J to 0.4 J.

According to some embodiments of the present disclosure, the compressor further includes a motor provided in the housing, the motor including a stator fixed to an inner wall of the housing and a rotor fixed to the crankshaft.

According to some embodiments of the present disclosure, the cylinder component includes two cylinders and a partition plate provided between the two cylinders.

Specifically, the partition plate is provided with a first oil way therein, a gap is defined between an inner peripheral wall of the partition plate and an outer peripheral wall of the crankshaft, the first oil way and the gap constitute the oil-way passage, and an outer peripheral wall of an eccentric portion of the crankshaft is provided with a second oil way in communication with the oil-way passage.

Specifically, the separating component further includes a separating plate, the separating plate cooperates with an inner peripheral wall of the housing to define the low-pressure chamber and the high-pressure chamber, the separating plate is provided with an assembling through hole, and the assembling through hole is sealingly fitted with an outer peripheral wall of the main bearing.

A vehicle according to embodiments of the present disclosure includes the above compressor.

For the vehicle according to embodiments of the present disclosure, by providing the above compressor, it is advantageous to realizing the on-demand oil pumping of the compressor, so as to achieve the maximum utilization of the lubricating oil in the compressor, thereby improving the efficiency of the compressor.

Figure 1:
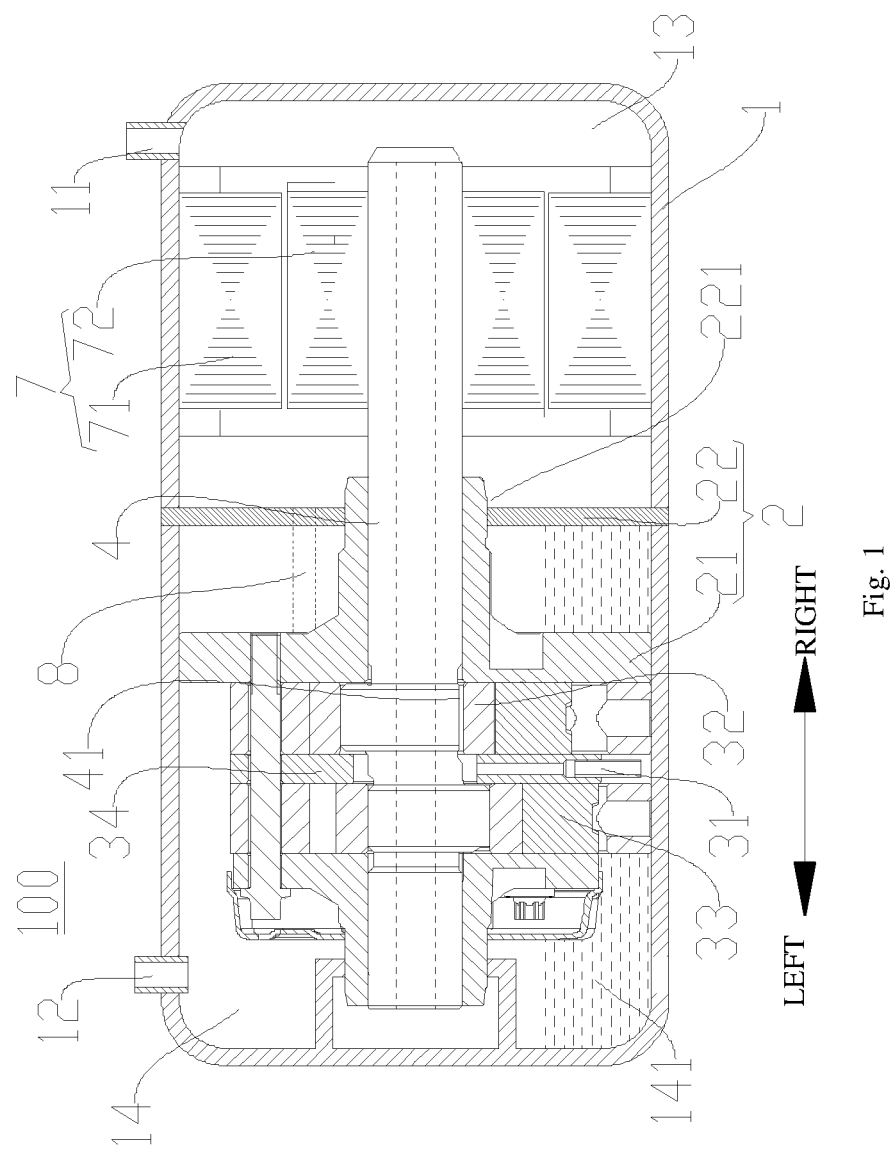
FIG. 1 illustrates a schematic view of a compressor in accordance with some embodiments of the present disclosure.

REFERENCE NUMERALS compressor 100,
  housing 1, air suction port 11, air exhaust port 12, low-pressure chamber 13, high-pressure chamber 14, oil sump 141,
  separating component 2, main bearing 21, separating plate 22, assembling through hole 221,
  cylinder component 3, oil-way passage 31, first oil way 311, gap 312, piston 32, cylinder 33, partition plate 34,
  crankshaft 4, second oil way 41,
  oil transmission groove 5, oil transition groove 6,
  motor 7, stator 71, rotor 72,
  air passage 8.

DETAILED DESCRIPTION

Embodiments of the present disclosure will be described in detail and examples of the embodiments will be illustrated in the drawings. The embodiments described herein with reference to drawings are illustrative and used to generally understand the present disclosure. The embodiments shall not be construed to limit the present disclosure.

In the specification, it is to be understood that terms such as "central," "width," "upper," "lower," "front," "rear," "left," "right," "vertical," "horizontal," "top," "bottom," "inner," "outer," "clockwise," "counterclockwise," "axial," "radial," "circumferential" and the like should be construed to refer to the orientation or position relationship as then described or as shown in the drawings under discussion. These relative terms are only for convenience and simplicity of description and do not indicate or imply that the referred device or element must have a particular orientation or be constructed or operated in a particular orientation. Thus, these terms shall not be construed to limit the present application.

In the description of the present disclosure, the term "a plurality of" means at least two, such as two, three, etc., unless specified otherwise.

A compressor 100 according to embodiments of the present disclosure will be described with reference to FIGS. 1-10. The compressor 100 can be applied to mobile equipment, such as high-speed trains, airplanes, tanks, ships, vehicles, space stations, satellites, and the like. Optionally, the compressor 100 may be a horizontal compressor or may be a vertical compressor.

As illustrated in FIGS. 1-3, FIG. 9 and FIG. 10, the compressor 100 according to embodiments of the present disclosure can include a housing 1, a separating component 2, a cylinder component 3, a crankshaft 4, a plurality of oil transmission grooves 5, and at least one oil transition groove 6.

Specifically, the housing 1 is provided with an air suction port 11 and an air exhaust port 12. A refrigerant can enter the housing 1 through the air suction port 11 of the compressor 100, and be discharged out of the housing 1 through the air exhaust port 12 after being compressed.

Figure 2:
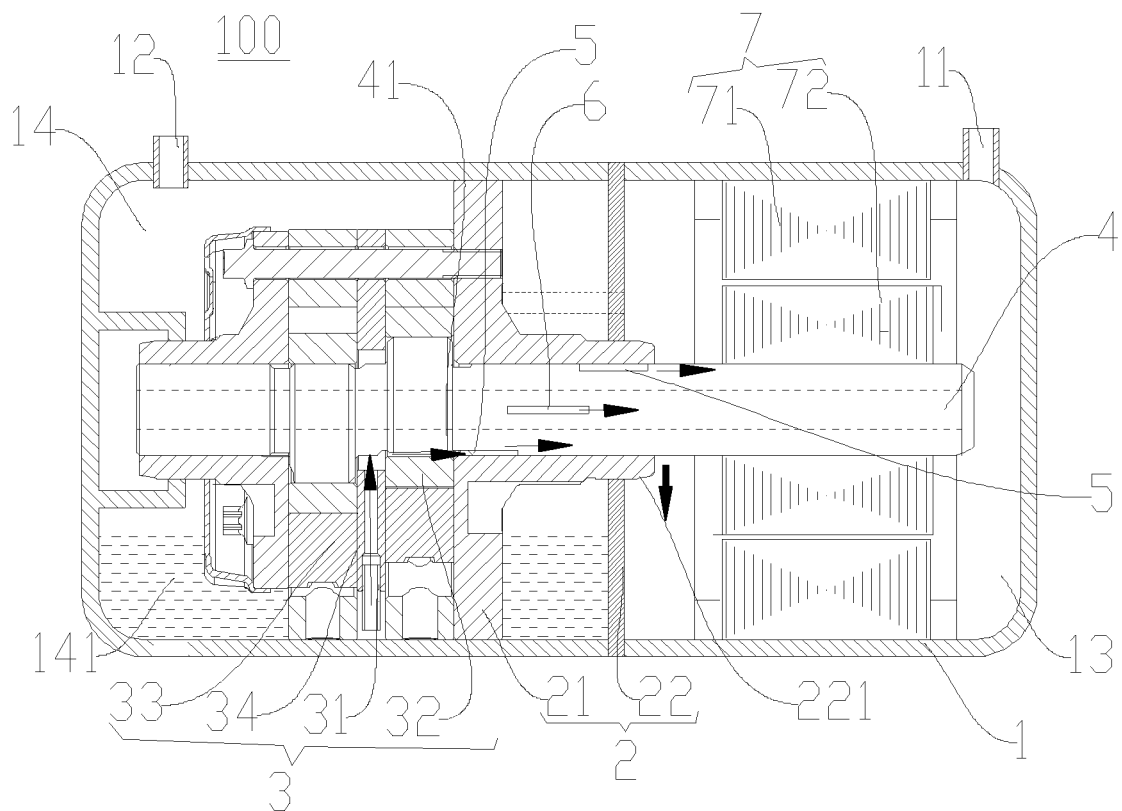
FIG. 2 illustrates a schematic view of oil circulation within a compressor.

As illustrated in FIGS. 1-2, the separating component 2 is provided to the housing 1 to divide an interior of the housing 1 into a low-pressure chamber 13 and a high-pressure chamber 14. For example, the separating component 2 is provided in the housing 1 to divide the interior of the housing 1 into a high-pressure chamber 14 and a low-pressure chamber 13 spaced apart from each other in a left-and-right direction. It should be noted that "left" and "right" are opposite directions, and according to schematic illustration of drawings, left and right directions are substantially parallel to an axial direction of the crankshaft 4.

The air suction port 11 is in communication with the low-pressure chamber 13, and the air exhaust port 12 is in communication with the high-pressure chamber 14. The separating component 2 includes a main bearing 21, and the main bearing 21 has a first side end surface (e.g., a right side shown in FIGS. 1-3) located in the low-pressure chamber 13 and a second side (e.g., a left side shown in FIGS. 1-3) located in the high-pressure chamber 14. The cylinder component 3 is provided in the high-pressure chamber 14, and a second side end surface of the main bearing 21 is provided to the cylinder component 3. The low-pressure chamber 13A is in communication with a compression chamber of the cylinder 33 through an air passage 8 (e.g., the separating component 2 is provided with the air passage 8). Thus, a refrigerant sucked through the air suction port 11 can enter the low-pressure chamber 13, the refrigerant in the low-pressure chamber 13 can enter a cylinder 33 of the cylinder component 3 via the air passage 8, and the refrigerant is discharged into the high-pressure chamber 14 after being compressed in the cylinder 33 and finally discharged out of the high-pressure chamber 14 through the air exhaust port 12.

Specifically, the high-pressure chamber 14 is provided with an oil sump 141 therein, and the cylinder component 3 is provided with an oil-way passage 31 in communication with the oil sump 141. The crankshaft 4 (e.g., an eccentric portion of the crankshaft 4) is fitted with a piston 32 of the cylinder component 3, and the main bearing 21 is fitted over the crankshaft 4. The crankshaft 4 has an end (e.g., a right end shown in FIGS. 1-2) extending into the low-pressure chamber 13. Specifically, with reference to FIGS. 1-3, in a right-to-left direction, a left end of the crankshaft 4 passes through the separating member 2, the cylinder component 3, and an auxiliary bearing sequentially, such that the crankshaft extends from the low-pressure chamber 13 to the high-pressure chamber 14.

As illustrated in FIGS. 2-7 and FIGS. 9-10, each oil transmission groove 5 and each oil transition groove 6 separately extend along the axial direction of the crankshaft 4. That is, each oil transmission groove 5 extends along the axial direction of the crankshaft 4 and each oil transition groove 6 extends along the axial direction of the crankshaft 4.

Figure 3:
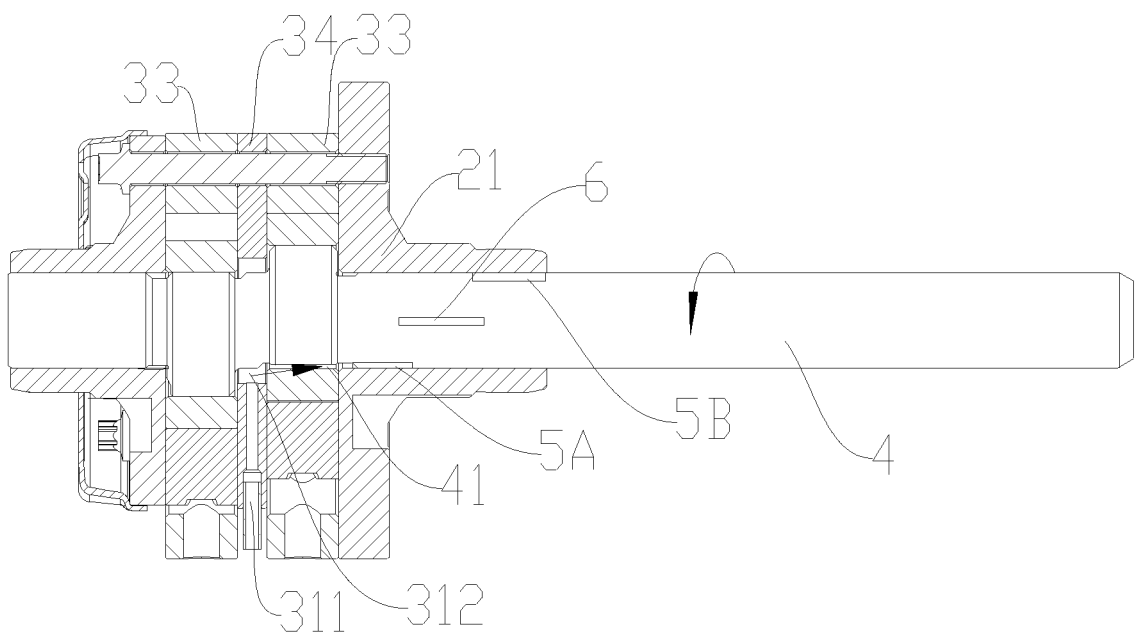
FIG. 3 illustrates a partially schematic view of the compressor shown in FIGS. 1-2.
Figure 4:
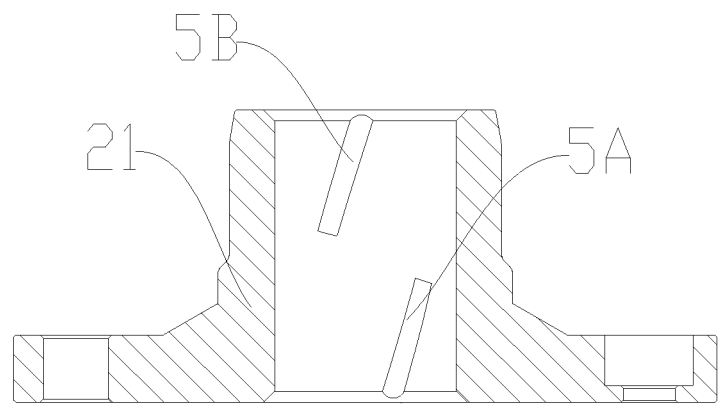
FIG. 4 illustrates a schematic view of a main bearing in accordance with some embodiments of the present disclosure.
Figure 5A:
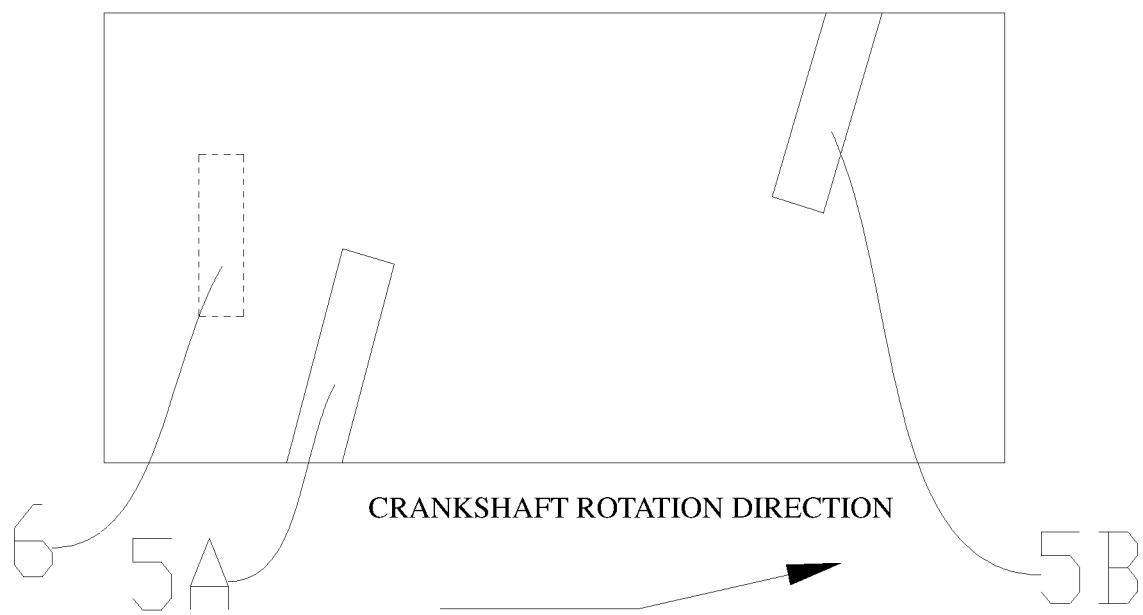
FIGS. 5(a)-5(d) illustrate how an oil transmission groove and an oil transition groove cooperate during rotation of a crankshaft, in which the main bearing shown in FIG. 4 is in an unfolded state.
Figure 5B:
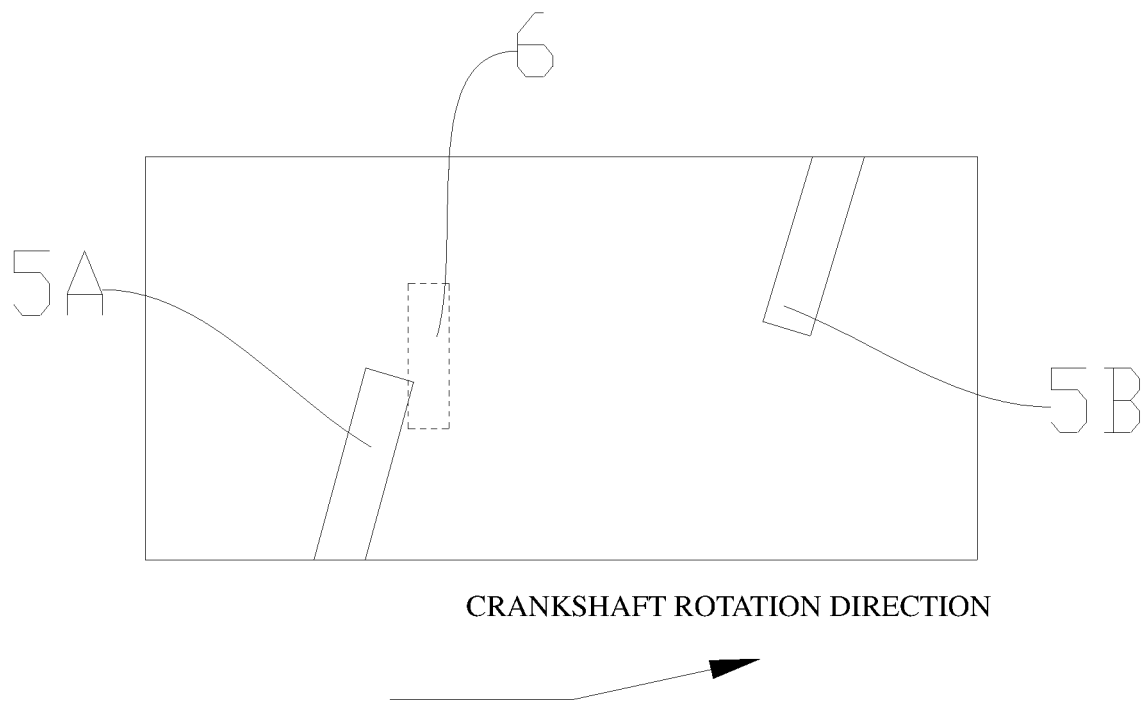
Figure 5C:
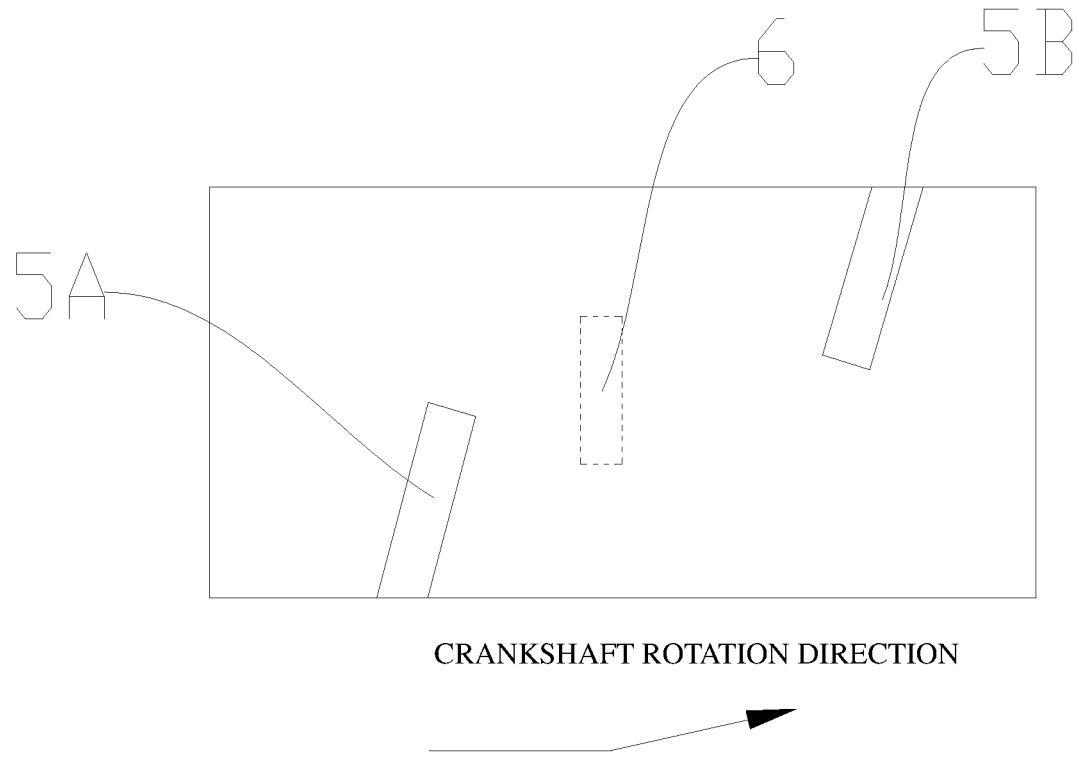
Figure 5D:
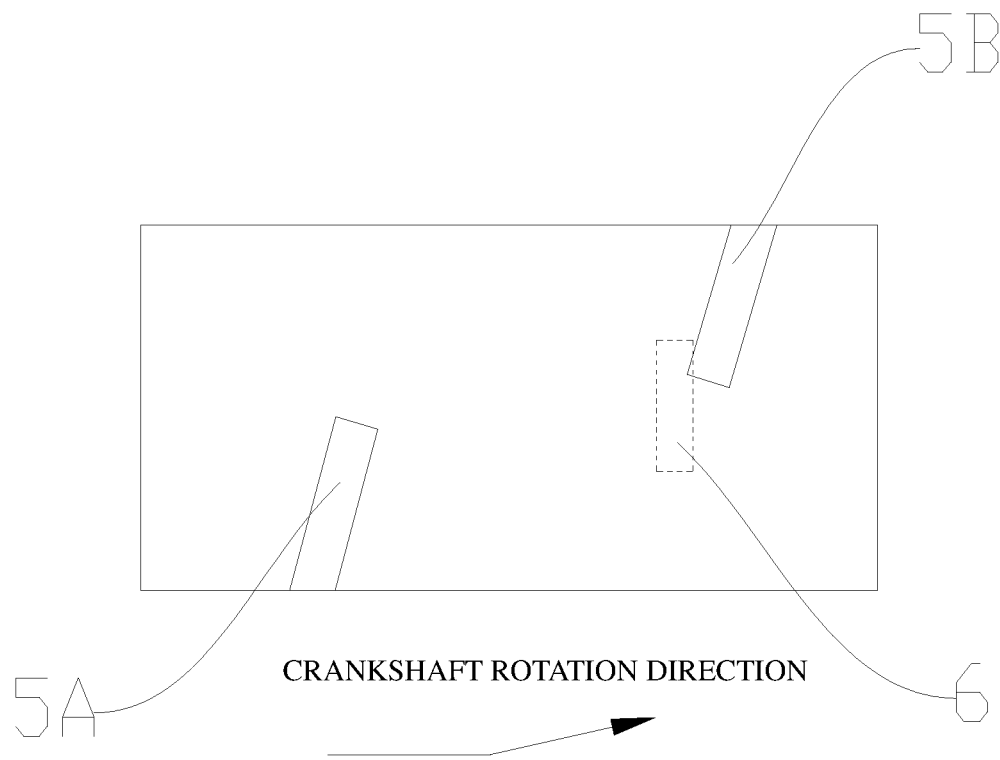
Figure 6:
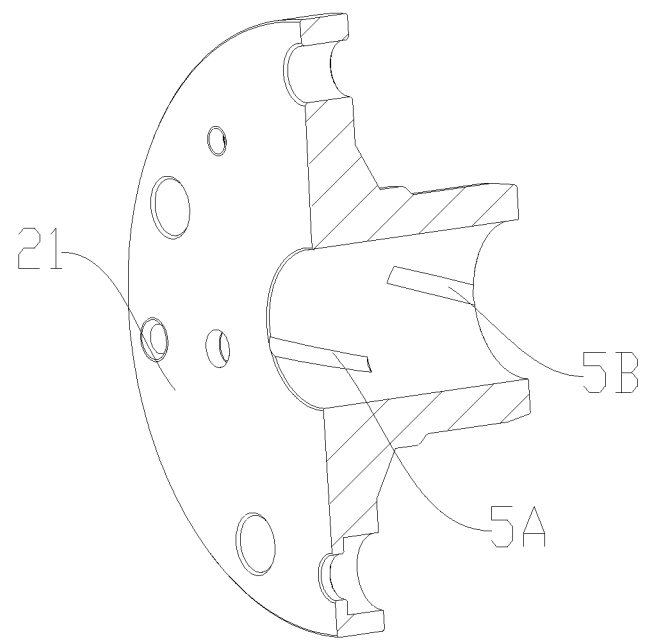
FIG. 6 illustrates a partially schematic view of the main bearing shown in FIG. 4.
Figure 7:
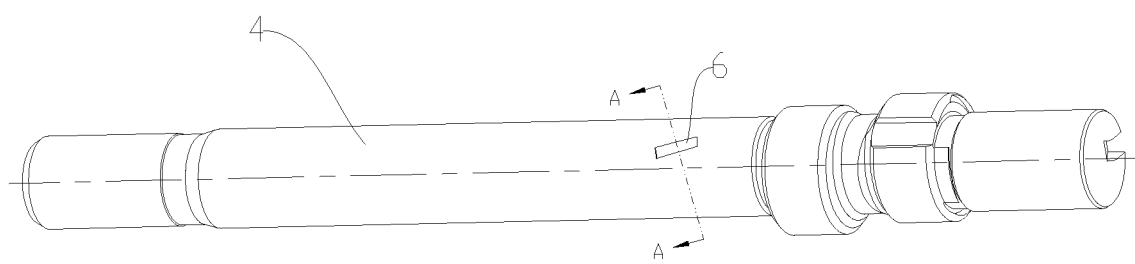
FIG. 7 illustrates a schematic view of a crankshaft in accordance with some embodiments of the present disclosure.
Figure 9:
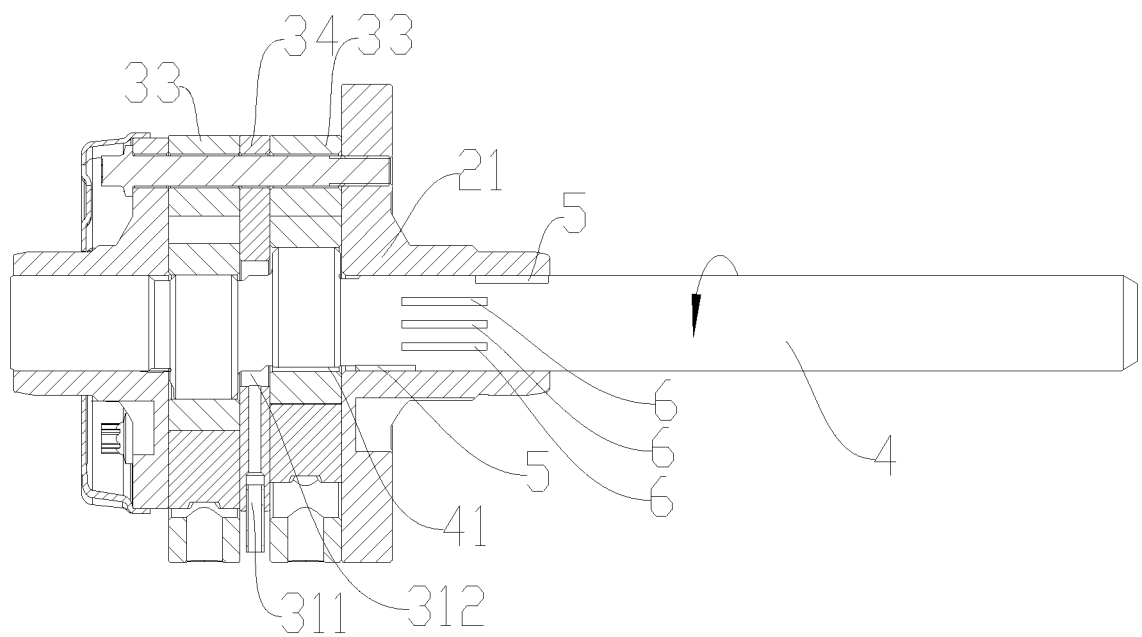
FIG. 9 illustrates a partially schematic view of a compressor in accordance with other embodiments of the present disclosure.
Figure 10:
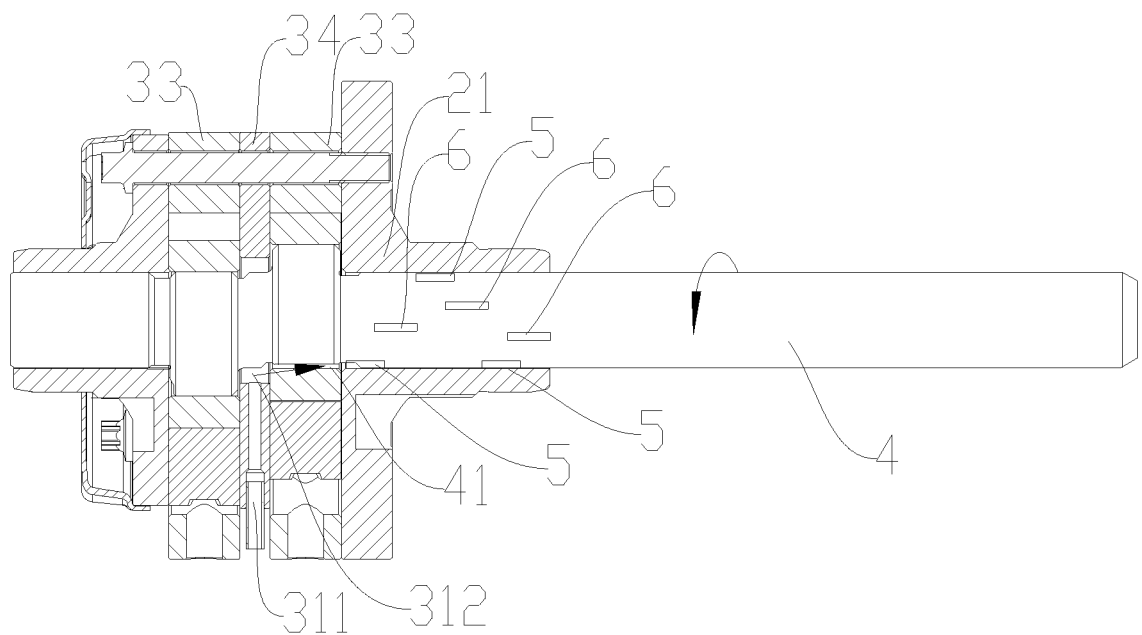
FIG. 10 illustrates a partially schematic view of a compressor in accordance with still other embodiments of the present disclosure.

The plurality of oil transmission grooves 5 and the at least one oil transition groove 6 are staggered in the axial direction of the crankshaft 4. For example, as shown in FIGS. 2-3, two oil transmission grooves 5 and one oil transition groove 6 are provided, the oil transition groove 6 is located between the two oil transmission grooves 5, and the two oil transmission grooves 5 and the oil transition groove 6 are spaced apart from one another in both the axial direction and circumferential direction of the crankshaft 4. For another example, a plurality of oil transmission grooves 5 and a plurality of oil transition grooves 6 are provided. In a case where the oil transmission groove 5 is defined as A and the oil transition groove 6 is defined as B, the plurality of oil transmission grooves 5 and the plurality of oil transition grooves 6 are spaced apart from one another in the axial direction of the crankshaft 4 and spirally arranged in a form of ABABAB . . . AB or in a form of ABABAB . . . A; or as illustrated in FIG. 10, the plurality of oil transmission grooves 5 and the plurality of oil transition grooves 6 are spaced apart from one another in the axial direction of the crankshaft 4 and arranged in the form of ABABAB . . . AB or in the form of ABABAB . . . A, in which a line connecting two oil transmission grooves 5 is not parallel to the axial direction of the crankshaft 4. For still another example, as illustrated in FIG. 9, a plurality of oil transmission grooves 5 are provided and spaced apart from each other in the circumferential direction and the axial direction of the crankshaft 4, a plurality of oil transition grooves 6 are provided between two adjacent oil transmission grooves 5 in the axial direction of the crankshaft 4, and the plurality of oil transition grooves 6 between two adjacent oil transmission grooves 5 are spaced apart from each other in the circumferential direction of the crankshaft 4.

During rotation of the crankshaft 4, each oil transition groove 6 is intermittently in communication with oil transmission grooves 5 adjacent thereto, and the oil transition groove 6 is alternately in communication with two oil transmission grooves 5 at two circumferential sides of the oil transition groove 6. That is, during one rotation cycle of the crankshaft 4, each oil transition groove 6 can be in communication with one of the oil transmission grooves 5 adjacent thereto; during this rotation cycle, after the crankshaft 4 rotates by a certain angle, each oil transition groove 6 can be in communication with the other one of the oil transmission grooves 5 adjacent thereto; when the crankshaft 4 rotates to a next rotation cycle, each oil transition groove 6 can be in communication with the one of the oil transmission grooves 5 adjacent thereto again.

It could be understood that the term "adjacent" means adjacency in the axial direction of the crankshaft 4 rather than in the circumferential direction of the crankshaft 4.

The oil transmission grooves are provided in one of the main bearing 21 and the crankshaft 4, and the oil transition groove 6 is provided in the other one of the main bearing 21 and the crankshaft 4. That is, when the oil transmission grooves 5 are provided in the main bearing 21, the oil transition groove 6 is provided in the crankshaft 4; when the oil transmission grooves 5 are provided in the crankshaft 4, the oil transition groove 6 is provided in the main bearing 21.

The oil-way passage 31 is in communication with one of the oil transmission grooves 5, and one of the oil transmission grooves 5 or the oil transition groove 6 is in communication with the low-pressure chamber 13. For example, as shown in FIGS. 2-3 and FIG. 9, the oil-way passage 31 is in communication with the oil transmission groove 5 adjacent thereto most, and the low-pressure chamber 13 is in communication with the oil transmission groove 5 adjacent thereto most. For another example, as shown in FIG. 10, the oil-way passage 31 is in communication with the oil transmission groove 5 adjacent thereto most, and the low-pressure chamber 13 is in communication with the oil transition groove 6 adjacent thereto most. It could be understood herein that the one of the oil transmission grooves 5 in communication with the oil-way passage 31 is different from the one of the oil transmission grooves 5 in communication with the low-pressure chamber 13. That is, when the oil-way passage 31 and the low-pressure chamber 13 are both in communication with the oil transmission grooves 5, the oil-way passage 31 and the low-pressure chamber 13 are in communication with different oil transmission grooves 5.

It could be understood that the compressor 100 further includes other structures, such as a blade, a blade groove, or the like. Other structures and working principles of the compressor 100 are well known to those skilled in the art and will not be elaborated herein.

An oil flow direction in the compressor 100 according to specific embodiments of the present disclosure will be described below with reference to FIGS. 1-4, FIGS. 5(*a*)-5(*d*) and FIG. 9.

As illustrated in FIGS. 1-4 and FIGS. 5(*a*)-5(*d*), two oil transmission grooves 5 are provided with and represented by an oil transmission groove 5A and an oil transmission groove 5B, one oil transition groove 6 is provided and located between the two oil transmission grooves 5, and the two oil transmission grooves 5 and the oil transition groove 6 are spaced apart from one another both in the axial direction and the circumferential direction of the crankshaft 4. The oil transmission grooves 5 are provided in the main bearing 21, and the oil transition groove 6 is provided in the crankshaft 4. When the compressor 100 operates, oil flows from the oil sump 141 to the oil-way passage 31 under the action of air pressure, and the oil in the oil-way passage 31 flows to one of the oil transmission grooves 5 (e.g., the oil transmission groove 5A in communication with the oil-way passage 31 and adjacent to the high-pressure chamber 14). During the rotation of the crankshaft 4, the crankshaft 4 drives the oil transition groove 6 to rotate, and the oil transition groove 6 in the crankshaft 4 is periodically in communication with the oil transmission groove 5A, and lubricating oil flows into the oil transition groove 6 through the oil transmission groove 5A under the action of oil pressure, in which the volume of oil flowing into the oil transition groove 6 is equal to the capacity of the oil transition groove 6, thereby accomplishing oil injection in the oil transition groove 6. When the crankshaft 4 continues rotating to a next angle, the oil transition groove 6 in the crankshaft 4 is in communication with the oil transmission groove 5B. Since pressure of the oil transmission groove 5B is equal to pressure at a low pressure side, and pressure of the oil transition groove 6 is approximately equal to pressure at a high pressure side, when the oil transition groove 6 is in communication with the oil transmission groove 5B, the oil in the oil transition groove 6 flows into the low-pressure chamber 13 through the oil transmission groove 5B under the pressure difference, thereby accomplishing oil pumping for a single time during one rotation cycle of the crankshaft 4.

It could be understood that as shown in FIG. 9, when two oil transmission grooves 5 are provided and spaced apart from each other in the circumferential direction and the axial direction of the crankshaft 4, and three oil transition grooves 6 are provided and located between the two oil transmission grooves 5 and spaced apart from each other in the circumferential direction of the crankshaft 4, oil pumping for three times can be accomplished during one rotation cycle of the crankshaft 4.

From the above, when the amount of oil pumping from the high-pressure chamber 14 to the low-pressure chamber 13 is related to the capacity of the oil transition groove 6, the number of oil transition grooves 6 between the adjacent two oil transmission grooves 5, and the rotational speed of the crankshaft 4, in the light of different oil demands of different compressors 100, the capacity of the oil transition groove 6, the number of oil transition grooves 6 between the adjacent two oil transmission grooves 5, and/or the rotational speed of the crankshaft 4 can be adjusted to control the oil amount pumped from the high-pressure chamber 14 to the low-pressure chamber 13, such that it is advantageous to realizing the on-demand oil pumping of the compressor 100, so as to achieve the maximum utilization of the lubricating oil in the compressor 100, thereby improving the working efficiency of the compressor 100.

In the compressor 100 according to embodiments of the present disclosure, the plurality of oil transmission grooves 5 and at least one oil transition groove 6 are provided and staggered in the axial direction of the crankshaft 4, and during the rotation of the crankshaft 4, each oil transition groove 6 is intermittently in communication with oil transmission grooves 5 adjacent thereto, and the oil transition groove 6 is alternately in communication with two oil transmission grooves 5 at two circumferential sides of the oil transition groove 6, such that it is advantageous to realizing the on-demand oil pumping of the compressor 100, so as to achieve the maximum utilization of the lubricating oil in the compressor 100, thereby improving the efficiency of the compressor 100.

In some embodiments of the present disclosure, the displacement of the compressor 100 is represented by A, and the capacity of the oil transition groove 6 ranges from 5 A/1000 to 30 A/1000, such that by optimizing the capacity of the oil transition groove 6, the oil supply from the high-pressure chamber 14 to the low-pressure chamber 13 is further controlled to optimize an oil pumping effect.

Figure 8:
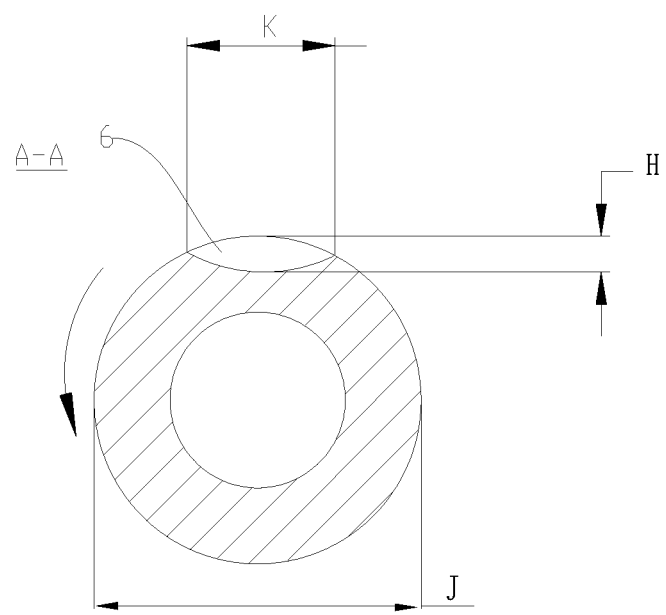
FIG. 8 illustrates a sectional view taken along A-A direction shown in FIG. 7.

In some embodiments of the present disclosure, as illustrated in FIG. 8, the oil transition groove 6 has a cross section with a maximum width represented by K, and the oil transition groove 6 has a depth represented by H, in which H<0.8K. Thus, by optimizing the dimension of the oil transition groove 6, the oil supply from the high-pressure chamber 14 to the low-pressure chamber 13 is further controlled to optimize the oil pumping effect.

In some embodiments of the present disclosure, the oil transition groove 6 is provided in an outer peripheral wall of the crankshaft 4, and the oil transmission groove 5 is provided in an inner wall of the main bearing 21 fitted with the crankshaft 4.

Specifically, as illustrated in FIG. 8, the crankshaft 4 has an outer diameter represented by J, and the maximum width of the cross section of the oil transition groove 6 is represented by K, in which K ranges from 0.1 J to 0.4 J. Thus, by optimizing the dimension of the oil transition groove 6, the oil supply from the high-pressure chamber 14 to the low-pressure chamber 13 is further controlled to optimize the oil pumping effect, and the structural strength of the crankshaft 4 can be guaranteed.

In some embodiments of the present disclosure, as illustrated in FIGS. 1 and 2, the compressor 100 further includes a motor 7 provided in the housing 1 (e.g., the motor 7 is provided in the low-pressure chamber 13). The motor 7 includes a stator 71 and a rotor 72, the stator 71 is fixed to an inner wall of the housing 1, and the rotor 72 is located in the stator 71 and fixed to the crankshaft 4. Specifically, the rotor 72 is fixed to the end of the crankshaft 4 located in the low-pressure chamber 13. Thus, the crankshaft 4 is driven to rotate through the rotation of the rotor 72, and meanwhile the low-pressure chamber 13 can facilitate the cooling of the motor 7.

In some embodiments of the present disclosure, as illustrated in FIGS. 1 and 2, the cylinder component 3 includes two cylinders 33 and a partition plate 34 provided between the two cylinders 33. Specifically, as illustrated in FIGS. 1-3, the partition plate 34 is provided with a first oil way 311 therein, and a gap 312 is defined between an inner peripheral wall of the partition plate 34 and the outer peripheral wall of the crankshaft 4. The first oil way 311 and the gap 312 constitute the oil-way passage 31, an outer peripheral wall of the eccentric portion of the crankshaft 4 is provided with a second oil way 41 in communication with the oil-way passage 31 (that is, the second oil way 41 is located between the outer peripheral wall of the eccentric portion and the piston 32), and the second oil way 41 is in communication with one of the oil transmission grooves 5, thereby realizing communication between the oil-way passage 31 and the one of the oil transmission grooves 5. When the compressor 100 operates, the lubricating oil in the oil sump 141 passes through the oil-way passage 31 and the second oil way 41 sequentially and is pumped to the one of the oil transmission grooves 5 under the pressure difference between the high-pressure chamber 14 and the low-pressure chamber 13. During the rotation of the crankshaft 4, the intermittent communication between the oil transmission grooves 5 and the oil transition groove 6, the lubricating oil in the high-pressure chamber 14 is periodically pumped into the low-pressure chamber 13.

In some embodiments of the present disclosure, the separating component 2 further includes a separating plate 22, and the separating plate 22 cooperates with an inner peripheral wall of the housing 1 to define the low-pressure chamber 13 and the high-pressure chamber 14. The separating plate 22 is provided with an assembling through hole 221, and the assembling through hole 221 is sealingly fitted with an outer peripheral wall of the main bearing 21, such that the low-pressure chamber 13 and the high-pressure chamber 14 are defined in the housing 1 by means of the separating plate 22 and the main bearing 21.

Optionally, the compressor 100 is configured as a rotary compressor, a vane compressor, a scroll compressor or the like.

A vehicle according to embodiments of the present disclosure will be described below.

The vehicle according to embodiments of the present disclosure includes the above compressor 100.

The vehicle according to embodiments of the present disclosure is provided with the above compressor 100, it is advantageous to realizing the on-demand oil pumping of the compressor 100, so as to achieve the maximum utilization of the lubricating oil in the compressor 100, thereby improving the efficiency of the compressor 100.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or mutual interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are contacted via an intervening structure. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the above phrases in various places throughout this specification are not necessarily referring to the same embodiment or example of the present disclosure. Additionally, the particular features, structures, materials, or characteristics may be combined in any suitable manner in one or more embodiments or examples. Furthermore, different embodiments or examples as well as features in different embodiments or examples described in the specification can be combined without any contradiction.

Although embodiments of the present disclosure have been shown and illustrated, it would be appreciated by those skilled in the art that the above embodiments are explanatory and shall not be constructed to limit the present disclosure. Any changes, modifications, alternatives and variations can be made in the above embodiments within the scope of the present disclosure.

What is claimed is:

1. A compressor, comprising:
    a housing provided with an air suction port and an air exhaust port;
    a separating component provided to the housing to divide an interior of the housing into a low-pressure chamber and a high-pressure chamber, the air suction port being in communication with the low-pressure chamber, the air exhaust port being in communication with the high-pressure chamber, the separating component comprising a main bearing having a first end surface located in the low-pressure chamber, and the high-pressure chamber being provided with an oil sump therein;
    a cylinder component provided in the high-pressure chamber, the main bearing having a second end surface provided to the cylinder component, and the cylinder component being provided with an oil-way passage in communication with the oil sump;
    a crankshaft fitted with a piston in the cylinder component, the main bearing being fitted over the crankshaft, and the crankshaft having an end extending into the lower pressure chamber; and
    a plurality of oil transmission grooves and at least one oil transition groove, each of the oil transmission grooves and each of the oil transition groove extending along an axial direction of the crankshaft, and the plurality of oil transmission grooves and the at least one oil transition groove being staggered in the axial direction of the crankshaft,
    wherein:
    during rotation of the crankshaft, each of the oil transition groove is intermittently in communication with one of the oil transmission grooves adjacent thereto, and said each of the oil transition groove is alternately in communication with two of the oil transmission grooves at two circumferential sides of said each of the oil transition groove;
    the oil transmission grooves are provided in one of the main bearing and the crankshaft, and the oil transition groove is provided in the other one of the main bearing and the crankshaft; and
    the oil-way passage is in communication with one of the oil transmission grooves, and the low-pressure chamber is in communication with another one of the oil transmission grooves or in communication with the oil transition groove.

2. The compressor according to claim 1, wherein the compressor has a displacement represented by A, and the oil transition groove has a capacity ranging from 5A/1000 to 30A/1000.

3. The compressor according to claim 2, wherein the oil transition groove has a cross section with a maximum width represented by K, and the oil transition groove has a depth represented by H, in which H<0.8K.

4. The compressor according to claim 3, wherein the oil transition groove is defined in an outer peripheral wall of the crankshaft.

5. The compressor according to claim 2, wherein the oil transition groove is defined in an outer peripheral wall of the crankshaft.

6. The compressor according to claim 1, wherein the oil transition groove has a cross section with a maximum width represented by K, and the oil transition groove has a depth represented by H, in which H<0.8K.

7. The compressor according to claim 1, wherein the oil transition groove is defined in an outer peripheral wall of the crankshaft.

8. The compressor according to claim 7, wherein the crankshaft has an outer diameter represented by J, and the oil transition groove has a cross section with a maximum width represented by K, in which K ranges from 0.1J to 0.4J.

9. The compressor according to claim 1, further comprising a motor provided in the housing, the motor comprising a stator fixed to an inner wall of the housing and a rotor fixed to the crankshaft.

10. The compressor according to claim 1, wherein the cylinder component comprises two cylinders and a partition plate provided between the two cylinders.

11. The compressor according to claim 7, wherein the partition plate is provided with a first oil way therein, a gap is defined between an inner peripheral wall of the partition plate and an outer peripheral wall of the crankshaft, the first oil way and the gap constitute the oil-way passage, and an outer peripheral wall of an eccentric portion of the crankshaft is provided with a second oil way in communication with the oil-way passage.

12. The compressor according to claim 1, wherein the separating component further comprises a separating plate, the separating plate cooperates with an inner peripheral wall of the housing to define the low-pressure chamber and the high-pressure chamber, the separating plate is provided with an assembling through hole, and the assembling through hole is sealingly fitted with an outer peripheral wall of the main bearing.

13. A vehicle, comprising a compressor according to claim 1.

* * * * *